(12) United States Patent
Hanyu (10) Patent No.: US 10,099,405 B2
(45) Date of Patent: Oct. 16, 2018

(54) SHEET CONVEYING ROLLER AND PRODUCTION METHOD THEREFOR

(71) Applicant: SUMITOMO RUBBER INDUSTRIES, LTD., Kobe-shi, Hyogo (JP)

(72) Inventor: Atsushi Hanyu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 427 days.

(21) Appl. No.: 14/939,879

(22) Filed: Nov. 12, 2015

(65) Prior Publication Data

US 2016/0067890 A1   Mar. 10, 2016

Related U.S. Application Data

(62) Division of application No. 13/723,765, filed on Dec. 21, 2012.

(30) Foreign Application Priority Data

Feb. 16, 2012  (JP) ................................ 2012-031793

(51) Int. Cl.
*B29C 39/02*   (2006.01)
*B65G 39/00*   (2006.01)
(Continued)

(52) U.S. Cl.
CPC ........ *B29C 39/026* (2013.01); *B29C 33/0033* (2013.01); *B29C 39/028* (2013.01);
(Continued)

(58) Field of Classification Search
CPC ... B29C 33/0033; B29C 33/42; B29C 39/026; B29C 39/10; B29C 39/26; B29C 53/40;
(Continued)

(56) References Cited

U.S. PATENT DOCUMENTS 3,141,817 A   7/1964 Collins et al.
3,227,854 A   1/1966 Ramsey et al.
(Continued)

FOREIGN PATENT DOCUMENTS

JP   48-18940 B    6/1973
JP   6-277733 A   10/1994
(Continued)

*Primary Examiner* — Jacob J Cigna
(74) *Attorney, Agent, or Firm* — Birch, Stewart, Kolasch & Birch, LLP (57) ABSTRACT

The present invention provides a sheet conveying roller, which effectively reduces the amount of paper dust accumulated on its outer peripheral surface to thereby suppress sheet transportation failure. The sheet conveying roller includes a nonporous tubular elastic member (1). The elastic member (1) has a plurality of recesses (6) or a plurality of through-holes (8) equidistantly arranged in a center axis (L1) direction thereof and equidistantly arranged in a circumferential direction thereof, and each having an opening having a round plan shape in an outer peripheral surface (2) thereof, wherein the recesses (6) each have a constant depth as measured thicknesswise of the elastic member (1), wherein the through-holes (8) each extend thicknesswise through the elastic member (1). A production method includes forming the elastic member by vulcanizing a rubber composition in a vulcanization mold having projections corresponding to the recesses or the through-holes.

1 Claim, 3 Drawing Sheets

(51) Int. Cl.
  *B29C 67/00* (2017.01)
  *B29C 33/00* (2006.01)
  *B29D 99/00* (2010.01)
  *B29C 39/26* (2006.01)
  *B29C 71/00* (2006.01)
  *B65G 39/07* (2006.01)
  *B29C 33/02* (2006.01)
  *B29C 33/76* (2006.01)
  *B29K 21/00* (2006.01)
  *B29L 23/00* (2006.01)
  *B29L 31/32* (2006.01)

(52) U.S. Cl.
  CPC .......... *B29C 39/26* (2013.01); *B29C 67/0014* (2013.01); *B29C 71/00* (2013.01); *B29D 99/0035* (2013.01); *B65G 39/00* (2013.01); *B29C 33/02* (2013.01); *B29C 33/76* (2013.01); *B29K 2021/00* (2013.01); *B29L 2023/00* (2013.01); *B29L 2031/32* (2013.01); *B65G 39/07* (2013.01)

(58) Field of Classification Search
  CPC ....... B29C 59/06; B29D 99/003; B32B 15/06; B65G 39/073; B65H 27/00; B65H 29/20; B65H 5/06
  USPC ..................................................... 492/30–36
  See application file for complete search history.

(56) References Cited

U.S. PATENT DOCUMENTS

| | | | |
|---|---|---|---|
| 4,584,747 A | 4/1986 | Katterbach et al. | |
| 4,923,572 A * | 5/1990 | Watkins | B29C 59/002 205/69 |
| 5,176,867 A * | 1/1993 | Thomas | B29C 33/3885 156/140 |
| 5,266,257 A * | 11/1993 | Kildune | B29C 39/026 101/401.1 |
| 5,807,004 A * | 9/1998 | Takei | B28B 1/24 400/659 |
| 5,908,680 A * | 6/1999 | Moren | B65H 27/00 19/112 |
| 6,106,447 A | 8/2000 | Schiel | |
| 6,173,496 B1 | 1/2001 | Makoui et al. | |
| 2004/0026844 A1* | 2/2004 | Toriumi | B65H 27/00 271/109 |
| 2006/0071421 A1* | 4/2006 | Itoh | B65H 27/00 271/272 |
| 2006/0082052 A1 | 4/2006 | Noda | |
| 2010/0151191 A1 | 6/2010 | Thomas et al. | |
| 2011/0267413 A1 | 11/2011 | Nakano et al. | |

FOREIGN PATENT DOCUMENTS

| | | |
|---|---|---|
| JP | 9-1576 A | 1/1997 |
| JP | 10-059578 A | 3/1998 |
| JP | 11-151764 A | 6/1999 |
| JP | 2000-118779 A | 4/2000 |
| JP | 2001-315987 A | 11/2001 |
| JP | 2002-046873 A | 2/2002 |
| JP | 2005-231859 A | 9/2005 |
| JP | 2006-143471 A | 6/2006 |
| JP | 2007-138994 A | 6/2007 |
| JP | 2007-147909 A | 6/2007 |
| JP | 2011-230916 A | 11/2011 |

* cited by examiner

SHEET CONVEYING ROLLER AND PRODUCTION METHOD THEREFOR

CROSS REFERENCE

The present application is a 37 C.F.R. § 1.53(b) divisional of, and claims priority to, U.S. application Ser. No. 13/723,765, filed on Dec. 21, 2012, now abandoned. Priority is claimed to Japanese Application No. 2012-031793 filed on Feb. 16, 2012. The entire content of this application is hereby incorporated by reference.

TECHNICAL FIELD

The present invention relates to a sheet conveying roller to be used for conveying sheets in electrostatic copying machines, various types of printers and the like, and to a production method for the sheet conveying roller.

BACKGROUND ART

Various types of sheet conveying rollers are incorporated in sheet conveying mechanisms provided, for example, in electrostatic copying machines, laser printers, plain paper facsimile machines, copier-printer-facsimile multifunction machines, inkjet printers, automatic teller machines (ATM) and the like.

Examples of the sheet conveying rollers include sheet feed rollers, transport rollers, platen rollers and sheet output rollers, which are each adapted to be rotated in frictional contact with a sheet (the term "sheet" is herein defined to include a paper sheet, a plastic film and the like, and this definition is effective in the following description) to convey the sheet.

Such a conventional sheet conveying roller typically includes a tubular elastic member made of a rubber such as a natural rubber (NR), a urethane rubber (U), an ethylene-propylene-diene rubber (EPDM), a polynorbornene rubber, a silicone rubber or a chlorinated polyethylene rubber, and having an outer peripheral surface serving as a contact surface to be brought into contact with the sheet.

However, paper dust and dirt generated from paper sheets are liable to adhere to the outer peripheral surface of the elastic member. As the sheet conveying roller is repeatedly brought into contact with the paper sheets, the paper dust and the dirt are accumulated on the outer peripheral surface. This reduces the contact area and the frictional coefficient of the elastic member with respect to a paper sheet, thereby causing sheet transportation failure at a relatively early stage.

Particularly, paper sheets having a higher ash content are widely used for reduction of running costs of the machines in recent years. The higher ash content paper sheets are more liable to generate paper dust and dirt, so that the accumulation of the paper dust and the dirt and the sheet transportation failure attributable to the accumulation are more liable to occur.

Various attempts have been made to prevent the accumulation of the paper dust and the dirt, and the sheet transportation failure attributable to the accumulation.

Patent Literature 1, for example, discloses a so-called knurled roller, which includes a non-porous tubular elastic member such as of a rubber having a plurality of grooves formed in an outer peripheral surface thereof as extending parallel to its axis along its entire width for use as a sheet conveying roller.

The grooves of the knurled roller function as pockets for trapping paper dust and dirt, thereby reducing the amount of the paper dust and the dirt accumulated on the outer peripheral surface to be brought into direct contact with paper sheets. Thus, the sheet transportation failure can be suppressed which may otherwise occur due to the accumulation of the paper dust and the dirt.

However, the knurled roller suffers from the following problem, because the grooves extend axially of the elastic member along the entire width of the elastic member.

Consider a state in which a region of the outer peripheral surface of the elastic member formed with the groove is in contact with a sheet and a state in which a region of the outer peripheral surface of the elastic member formed with no groove is in contact with a sheet. A sheet contact area is smaller in the former state than in the latter state and, hence, a sheet transportation force is smaller in the former state than in the latter state.

Therefore, the two types of regions having different transportation forces are alternately brought into contact with the sheet, as the knurled roller is rotated. Accordingly, the sheet transportation force is pulsated. This makes it impossible to maintain the transportation force at a constant level.

Consider a state in which opposite edges of the groove abut against the sheet. In this state, a distance between the center axis of the knurled roller and the sheet is smaller than in the state in which the region of the outer peripheral surface formed with no groove abuts against the sheet. That is, the knurled roller virtually has different outer diameters in the region thereof formed with the groove and in the region thereof formed with no groove.

Therefore, the two types of regions having different outer diameters are alternately brought into contact with the sheet, as the knurled roller is rotated. Accordingly, the sheet transportation speed is also pulsated. This makes it impossible to maintain the transportation speed at a constant level.

Further, the region of the outer peripheral surface formed with no groove transports the sheet in surface contact with the sheet, while the region of the outer peripheral surface formed with the groove transports the sheet with the edges of the groove brought into line contact with the sheet by a so-called scratching effect. Where paper sheets having a greater amount of paper dust and dirt are occasionally transported, for example, the grooves extending along the entire width of the knurled roller simultaneously lose the scratching effect along their entire lengths, so that the sheets are liable to suffer from slippage.

Therefore, the knurled roller liable to suffer from the pulsation of the transportation speed and the slippage is not suitable for a use application requiring precise sheet feeding or for a use application requiring the control of the sheet feed amount for the sheet feeding.

In addition, a sheet contact pressure does not act on a groove portion of the knurled roller and, if the sheet contact pressure is set at a higher level, there is a great difference in contact pressure between the groove portion and portions of the knurled roller located at opposite sides of the groove portion, resulting in wrinkle or indentation of the sheet.

Patent Literature 2 discloses a sheet conveying roller including a porous elastic member produced as having a multiplicity of cells by vulcanizing and foaming a rubber composition containing a foaming agent, and grinding an outer peripheral surface of the elastic member to expose multiple cells adjacent to the outer peripheral surface to form openings.

In the sheet conveying roller, the openings function as pockets for trapping paper dust and dirt, thereby reducing the amount of the paper dust and the dirt accumulated on the outer peripheral surface to be brought into direct contact with the paper sheet. Thus, the sheet transportation failure attributable to the accumulation of the paper dust and the dirt can be suppressed.

However, the porous elastic member has a smaller density, and is liable to be worn or suffer from a so-called permanent compressive deformation which is a phenomenon such that the elastic member is not restored to its original diameter after being compressed for a long period of time. Therefore, the sheet conveying roller including the porous elastic member is more liable to suffer from the wear and the permanent compressive deformation and, hence, has a shorter product service life than a sheet conveying roller including a non-porous elastic member.

If the outer diameter of the sheet conveying roller is changed due to the wear or the permanent compressive deformation, the sheet feed amount is significantly reduced as compared with the initial state even if the sheet conveying roller is rotated at the same rotation speed. That is, the sheet feed amount is not constant, but constantly changed due to the wear and the permanent compressive deformation of the elastic member.

Therefore, the sheet conveying roller including the porous elastic member is not suitable for a use application requiring precise sheet feeding or for a use application requiring the control of the sheet feed amount for the sheet feeding.

The shapes, the dimensions and the density (the per-unit-area number) of and distances between the openings formed in the outer peripheral surface, for example, by the foaming of the foaming agent and the subsequent grinding are not uniform, but vary on the outer peripheral surface of the elastic member. If the number of the openings is locally reduced or the diameters of the individual openings are locally reduced in some region on the outer peripheral surface, for example, the openings in the region fail to sufficiently function as the pockets for trapping the paper dust and the dirt, thereby failing to sufficiently suppress the sheet transportation failure attributable to the accumulation of the paper dust and the dirt. The variation in the geometry of the openings varies from product to product, so that the sheet transportation failure suppressing function also varies from product to product.

Patent Literature 3 discloses an elastic member which includes a plurality of annular grooves provided in an outer peripheral surface thereof and arranged perpendicularly to the axis thereof as extending circumferentially of the outer peripheral surface.

However, the grooves extending circumferentially of the outer peripheral surface fail to sufficiently function as pockets for trapping paper dust and dirt as compared with the aforementioned axial grooves and the openings of the porous cells.

In the two types of sheet conveying rollers previously described, the paper dust and the dirt adhering to the outer peripheral surface of the elastic member are conveyed to the axial grooves or the openings of the porous cells by the rotational force applied mainly circumferentially of the outer peripheral surface, and trapped in the axial grooves or the openings of the porous cells.

However, the circumferential grooves extend generally parallel to the direction of the rotational force, thereby failing to efficiently convey and trap the paper dust and the dirt by the rotational force.

Therefore, the circumferential grooves fail to sufficiently function as the pockets for trapping the paper dust and the dirt.

In addition, a sheet contact pressure does not act on a groove portion of the sheet conveying roller and, if the sheet contact pressure is set at a higher level, there is a great difference in contact pressure between the groove portion and portions of the sheet conveying roller located at opposite sides of the groove portion, resulting in wrinkle and indentation of the sheet.

CITATION LIST

Patent Literature

[Patent Literature 1] JP-HEI10(1998)-59578A
[Patent Literature 2] JP-2002-46873A
[Patent Literature 3] JP-2000-118779A

SUMMARY OF THE INVENTION

Problem to be Solved by the Invention

It is an object of the present invention to provide a sheet conveying roller, which effectively reduces the amount of paper dust and dirt accumulated on its outer peripheral surface to thereby suppress the sheet transportation failure, and is less liable to suffer from the slippage with the sheet transportation force and the sheet transportation speed thereof kept constant throughout the entire circumference thereof even if paper sheets having a greater amount of paper dust and dirt are occasionally transported, and is less liable to suffer from the change in the outer diameter thereof due to wear and permanent compressive deformation to thereby substantially prevent the sheet from being wrinkled or indented even if the contact pressure is set at a higher level. It is another object of the present invention to provide a production method which permits efficient production of the inventive sheet conveying roller at higher productivity.

Solution to Problem

The present invention provides a sheet conveying roller, which includes a non-porous tubular elastic member, wherein the elastic member has a plurality of recesses or a plurality of through-holes provided in an outer peripheral surface thereof as equidistantly arranged in a center axis direction thereof and equidistantly arranged in a circumferential direction thereof, and each having an opening having a round plan shape or a plan shape inscribed inside a circle in the outer peripheral surface thereof, wherein the recesses each have a constant depth as measured thicknesswise of the elastic member, wherein the through-holes each extend thicknesswise through the elastic member.

According to the present invention, the elastic member is non-porous and, therefore, is less liable to suffer from the change in the outer diameter thereof due to the wear and the permanent compressive deformation than the porous elastic member, thereby having a prolonged product service life. Further, the sheet feed amount is prevented from being changed due to the change in the outer diameter, and is constantly maintained at a certain level.

According to the present invention, the recesses or the through-holes each having the opening having the round plan shape or the plan shape inscribed inside the circle are provided in the outer peripheral surface of the elastic member as equidistantly arranged in the center axis direction of the elastic member and equidistantly arranged in the circumferential direction of the elastic member.

Therefore, the recesses or the through-holes efficiently and uniformly function as pockets for trapping the paper dust and the dirt over the entire outer peripheral surface, thereby reducing the amount of the paper dust and the dirt accumulated on the outer peripheral surface to be brought into direct contact with the paper sheet. Thus, the sheet transportation failure can be suppressed which may otherwise occur due to the accumulation of the paper dust and the dirt. A distance between the recesses or the through-holes in the axially equidistant arrangement and a distance between the recesses or the through-holes in the circumferentially equidistant arrangement may be the same or different.

The openings of the recesses or the through-holes are evenly present in the entire outer peripheral surface of the tubular elastic member and, unlike the grooves in the prior art rollers, eliminate the possibility that the outer peripheral surface of the elastic member is circumferentially discontinuous. Therefore, the outer dimensions of the entire outer peripheral surface of the elastic member are constant. Thus, the sheet transportation speed at which the sheet is conveyed by the rotation of the sheet conveying roller can be constantly maintained at a certain level.

In addition, the openings of the recesses or the through-holes are equidistantly arranged in the axial direction of the elastic member and equidistantly arranged in the circumferential direction of the elastic member, so that the sheet contact area of the outer peripheral surface having the openings of the recesses or the through-holes is generally constant over the entire outer peripheral surface. Thus, the sheet transportation force with which the sheet is conveyed by the rotation of the sheet conveying roller can be constantly maintained at a certain level.

As a result, the sheet slippage can be reliably prevented even if paper sheets having a greater amount of paper dust and dirt are occasionally transported.

Therefore, the inventive sheet conveying roller is less liable to suffer from the change in the outer diameter thereof due to the wear or the permanent compressive deformation of the elastic member as described above. In addition, the inventive sheet conveying roller can be advantageously used for the application requiring the precise sheet feeding or for the application requiring the control of the sheet feed amount for the sheet feeding.

In addition, the sheet conveying roller holds the sheet while the entire peripheries of some of the openings in the outer peripheral surface of the elastic member are kept in press contact with the sheet. Further, the openings each have a significantly smaller size than the axial grooves or the circumferential grooves in the prior art rollers. Therefore, even if the contact pressure is set at a higher level, for example, the sheet is prevented from being wrinkled or indented.

The plan shapes of the recesses or the through-holes preferably include at least one shape selected from the group consisting of a round shape, a rectangular shape, a rhombic shape, an oval shape, a five or more sided polygonal shape and a combination of any of these shapes.

The present invention provides a method of producing a sheet conveying roller, the method comprising the steps of:
providing a vulcanization mold which includes an outer mold and an inner mold,
the outer mold being circumferentially dividable into at least two mold pieces, and having a shape-imparting tubular inner surface corresponding to an outer peripheral surface of an elastic member of the sheet conveying roller, and a plurality of projections projecting radially inward from the shape-imparting inner surface and each having a sectional shape corresponding to a plan shape of recesses of the elastic member and a projection height corresponding to a depth of the recesses as measured thicknesswise of the elastic member,
the inner mold having a shape-imparting tubular outer surface to be located coaxially with the shape-imparting inner surface so as to be spaced a distance corresponding to the thickness of the elastic member from the shape-imparting inner surface; and
forming the elastic member having the plurality of recesses corresponding to the projections in the outer peripheral surface thereof by preheating the vulcanization mold, locating the shape-imparting inner surface of the outer mold and the shape-imparting outer surface of the inner mold of the vulcanization mold coaxially with each other, filling a space defined between the shape-imparting inner surface and the shape-imparting outer surface with a rubber composition as a material for the elastic member, and vulcanizing the rubber composition.

According to the present invention, the inventive sheet conveying roller including the elastic member having the plurality of recesses can be efficiently produced at higher productivity.

The present invention further provides a method of producing a sheet conveying roller, the method comprising the steps of:
(1) providing a vulcanization mold which includes an outer mold and an inner mold,
the outer mold being circumferentially dividable into at least two mold pieces, and having a shape-imparting tubular inner surface having an inner diameter equal to a sum of an outer diameter of an elastic member of the sheet conveying roller and a predetermined grinding margin,
the inner mold having a shape-imparting tubular outer surface to be located coaxially with the shape-imparting inner surface so as to be spaced a distance equal to a sum of a thickness of the elastic member and the grinding margin from the shape-imparting inner surface, and a plurality of projections projecting radially outward from the shape-imparting outer surface and each having a sectional shape corresponding to a plan shape of through-holes of the elastic member and a projection height that is not less than the thickness of the elastic member and less than the sum of the thickness of the elastic member and the grinding margin, and
forming an elastic body having a plurality of recesses corresponding to the projections in an inner peripheral surface of the elastic body by preheating the vulcanization mold, locating the shape-imparting inner surface of the outer mold and the shape-imparting outer surface of the inner mold of the vulcanization mold coaxially with each other, filling a space defined between the shape-imparting inner surface and the shape-imparting outer surface with a rubber composition as a material for the elastic member, and vulcanizing the rubber composition; and
(2) grinding an outer peripheral portion of the elastic body by the grinding margin to expose the recesses in an outer peripheral surface of the resulting elastic body to form the plurality of through-holes in the elastic member.

According to the present invention, the inventive sheet conveying roller including the elastic member having the plurality of through-holes can be efficiently produced at higher productivity.

Effects of the Invention

According to the present invention, the sheet conveying roller is provided, which effectively reduces the amount of paper dust and dirt accumulated on its outer peripheral surface to thereby suppress the sheet transportation failure, and is less liable to suffer from the slippage with the sheet transportation force and the transportation speed thereof kept constant throughout the entire circumference thereof even if paper sheets having a greater amount of paper dust and dirt are occasionally transported, and is less liable to suffer from the change in the outer diameter thereof due to the wear and the permanent compressive deformation to thereby substantially prevent the sheet from being wrinkled or indented even if the contact pressure is set at a higher level. According to the present invention, the production methods are provided, which permit efficient production of the inventive sheet conveying roller at higher productivity.

EMBODIMENTS OF THE INVENTION

Figure 1:
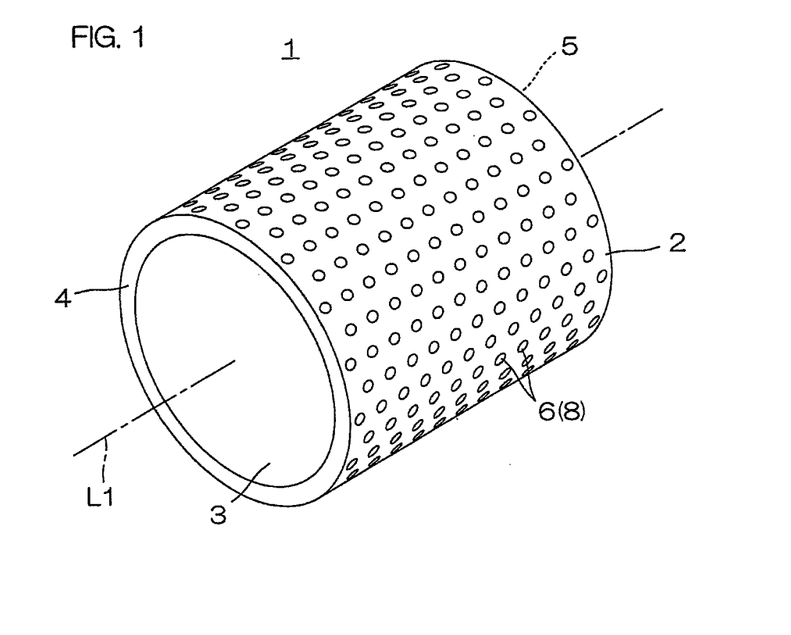
FIG. 1 is a perspective view showing the appearance of an elastic member which is a major portion of a sheet conveying roller according to one embodiment of the present invention.
Figure 2:
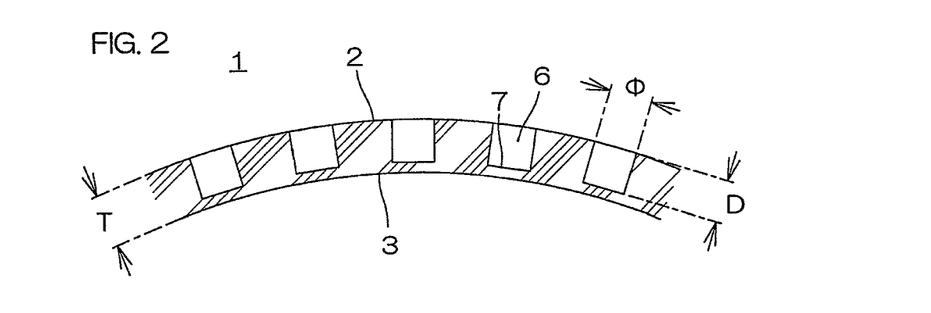
FIG. 2 is a sectional view illustrating a part of the elastic member of FIG. 1 taken perpendicularly to a center axis L1 of FIG. 1 on an enlarged scale.
Figure 3:
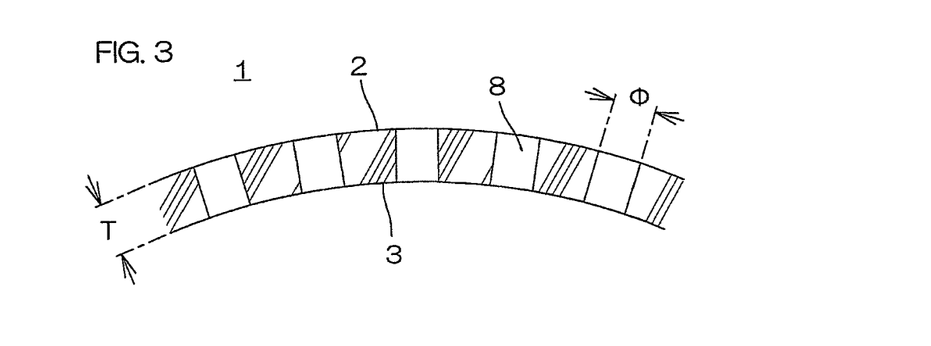
FIG. 3 is a sectional view illustrating a part of a modification of the elastic member taken perpendicularly to the center axis L1 of FIG. 1 on an enlarged scale.
Figure 4A:
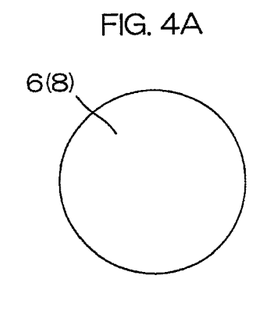
FIGS. 4A to 4H are plan views showing exemplary plan shapes of a through-hole or a recess having an opening in an outer peripheral surface of the elastic member as seen perpendicularly to the outer peripheral surface.

FIG. 1 is a perspective view showing the appearance of an elastic member which is a major portion of a sheet conveying roller according to one embodiment of the present invention. FIG. 2 is a sectional view illustrating a part of the elastic member taken perpendicularly to a center axis L1 of FIG. 1 on an enlarged scale. FIG. 3 is a sectional view illustrating a part of a modification of the elastic member taken perpendicularly to the center axis L1 of FIG. 1 on an enlarged scale. FIG. 4A is a plan view showing an exemplary plan shape of a through-hole or a recess having an opening in an outer peripheral surface of the elastic member as seen perpendicularly to the outer peripheral surface.

Referring to FIG. 1, the elastic member 1 according to the embodiment has a tubular shape having a constant thickness. The elastic member is a non-porous elastic member made of a natural rubber (NR), a urethane rubber (U), an ethylene propylene diene rubber (EPDM), a polynorbornene rubber, a silicone rubber or a chlorinated polyethylene rubber as in the prior art and containing substantially no air bubble therein.

The elastic member 1 has an outer peripheral surface 2 to be brought into direct contact with a sheet, and an inner peripheral surface 3. The outer peripheral surface 2 and the inner peripheral surface 3 are disposed coaxially with each other about the common center axis L1. Thus, the thickness of the elastic member 1 is constant throughout the entire circumference of the elastic member 1.

A sleeve not shown is fitted in the tubular elastic member 1 with an outer peripheral surface thereof fixed to the inner peripheral surface 3 of the elastic member 1 directly or with an adhesive agent to provide the sheet conveying roller.

Opposite end faces 4, 5 of the elastic member 1 with respect to the center axis L1 are flat surfaces perpendicular to the center axis L1 and parallel to each other. Thus, the outer peripheral surface 2 of the elastic member 1 has a constant width throughout the entire circumference thereof.

Referring to FIGS. 1 to 4(a), the elastic member 1 has a plurality of recesses 6 each having a predetermined depth D as measured along the thickness of the elastic member 1 or a plurality of through-holes 8 each extending from the outer peripheral surface 2 to the inner peripheral surface 3 of the elastic member 1. The recesses 6 or the through-holes 8 each have an opening having a round plan shape in the outer peripheral surface 2 of the elastic member 1 as seen perpendicularly to the outer peripheral surface.

Referring to FIGS. 1, 2 and 4(a), the recesses 6 each have a bottom surface 7 having a round plan shape having the same diameter as the opening as seen perpendicularly to the outer peripheral surface 2. A portion of each of the recesses 6 between the opening and the bottom surface 7 has a round plan shape having the same diameter as the opening and the bottom surface 7 as seen perpendicularly to the outer peripheral surface 2. That is, the recesses each have a small cylindrical shape.

The depth D of each of the recesses 6 measured along the thickness of the elastic member 1 may be set to any value less than the thickness T of the elastic member 1. The depth D is preferably not less than 50% of the thickness T.

If the depth D is less than the aforementioned range, the recesses 6 each have a smaller volume, thereby failing to properly function as pockets for trapping paper dust and dirt for a long period of time.

Where the depth D is within the aforementioned range, on the other hand, the recesses 6 can properly function as the pockets for trapping the paper dust and the dirt for a long period of time.

The upper limit of the depth D may be defined to be less than the thickness T of the elastic member 1. This definition aims to practically discriminate the recesses 6 from the through-holes 8 which each have a depth D equal to the thickness T, and does not mean that the recesses 6 and the through-holes 8 have different functions.

The openings of the recesses 6 in the outer peripheral surface 2 of the elastic member 1 may each have an opening diameter Φ arbitrarily set, but the opening diameter Φ is preferably not less than 0.5 mm and not greater than 5 mm.

If the opening diameter Φ is less than the aforementioned range, the recesses 6 each have a smaller volume, failing to properly function as the pockets for trapping the paper dust and the dirt for a long period of time. If the opening diameter Φ is greater than the aforementioned range, on the other hand, the openings are too large, so that paper dust and dirt once trapped are liable to be released outside the recesses 6. Therefore, the recesses 6 are liable to fail to properly function as the pockets for trapping the paper dust and the dirt for a long period of time.

In contrast, where the opening diameter Φ is within the aforementioned range, the recesses 6 can properly function as the pockets for trapping the paper dust and the dirt for a long period of time.

Referring to FIGS. 1, 3 and 4(a), the through-holes 8 each extend from the outer peripheral surface 2 to the inner peripheral surface 3, and each have an opening having a round plan shape as seen perpendicularly to the outer peripheral surface 2. A portion of each of the through-holes 8 between the outer peripheral surface 2 and the inner peripheral surface 3 has a round plan shape having the same diameter as the openings of the through-holes 8 in the outer and inner peripheral surfaces 2, 3 as seen perpendicularly to the outer peripheral surface 2. That is, the through-holes 8 each have a small cylindrical shape.

The openings of the through-holes 8 in the outer peripheral surface 2 of the elastic member 1 may each have an opening diameter Φ arbitrarily set, but the opening diameter Φ is preferably not less than 0.5 mm and not greater than 5 mm.

If the opening diameter Φ is less than the aforementioned range, the through-holes 8 each have a smaller volume, failing to properly function as the pockets for trapping the paper dust and the dirt for a long period of time. If the opening diameter Φ is greater than the aforementioned range, on the other hand, the openings are too large, so that paper dust and dirt once trapped are liable to be released outside the through-holes 8. Therefore, the through-holes 8 are liable to fail to properly function as the pockets for trapping the paper dust and the dirt for a long period of time.

In contrast, where the opening diameter Φ is within the aforementioned range, the through-holes 8 can properly function as the pockets for trapping the paper dust and the dirt for a long period of time.

In the illustrated examples, only the plurality of recesses 6 or only the plurality of through-holes 8 are provided in the elastic member 1, but the elastic member 1 may include recesses 6 and through-holes 8 in combination.

The plan shape of the opening of each of the recesses 6 or the through-holes 8 is not limited to the round shape. FIGS. 4B to 4H are plan views showing other exemplary plan shapes of the opening of the recess 6 or the through-hole 8.

Figure 4B:
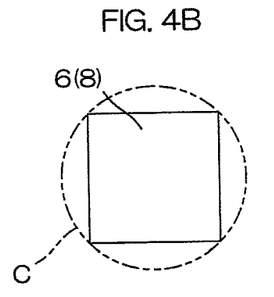
Figure 4C:
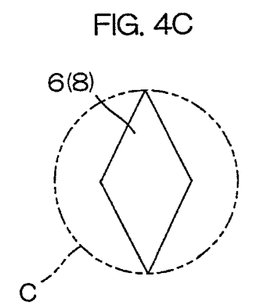
Figure 4D:
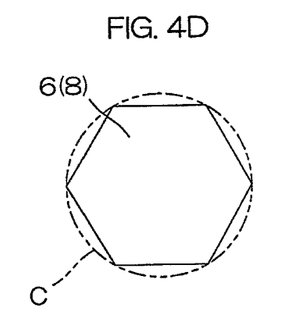
Figure 4E:
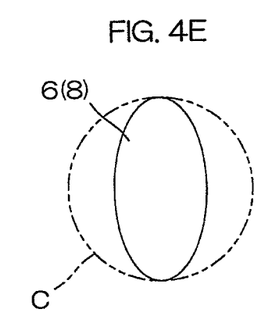
Figure 4F:
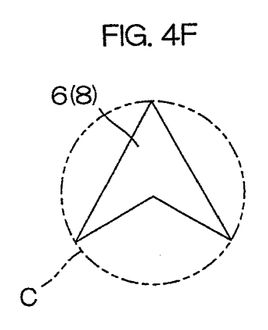
Figure 4G:
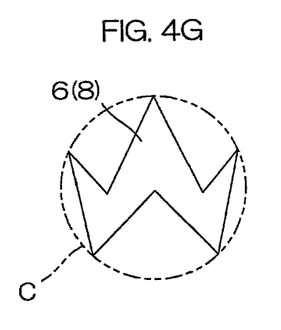
Figure 4H:
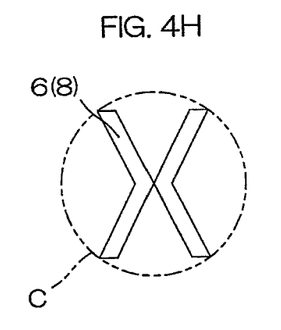

That is, the openings of the recesses 6 or the through-holes 8 may each have a given shape inscribed inside a circle C indicated by a two-dot-and-dash line in FIGS. 4A to 4H, for example, a rectangular shape as shown in FIG. 4B, a rhombic shape as shown in FIG. 4C, a polygonal shape such as a hexagonal shape as shown in FIG. 4D, an oval shape as shown in FIG. 4E, a V-shape as shown in FIG. 4F, a W-shape as shown in FIG. 4G, or an X-shape as shown in FIG. 4H.

The recesses 6 or the through-holes 8 may each have a plan shape and a size arbitrarily set. In order to facilitate the demolding of a vulcanized elastic member 1 from a vulcanization mold in a production method to be described later and to prevent fracture and cracking of the elastic member 1, the recesses 6 preferably each have the same plan shape in any portion between the opening in the outer peripheral surface 2 and the bottom surface 7. Similarly, the through-holes 8 preferably each have the same plan shape in any portion between the opening in the outer peripheral surface 2 and the opening in the inner peripheral surface 3.

The recesses 6 each having the same plan shape in any portion between the opening in the outer peripheral surface 2 and the bottom surface 7 or the through-holes 8 each having the same plan shape in any portion between the opening in the outer peripheral surface 2 and the opening in the inner peripheral surface 3 may be each tapered in a demolding direction to facilitate the demolding.

Figure 5:
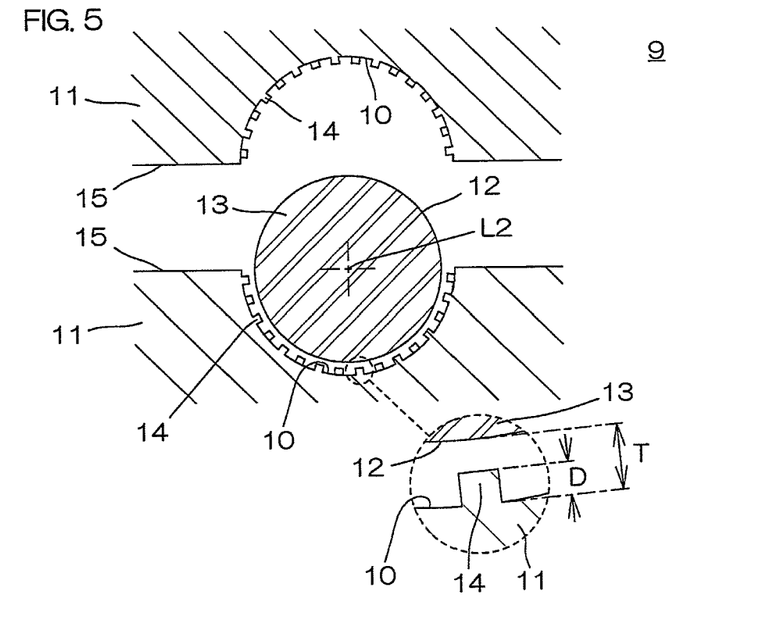
FIG. 5 is a sectional view illustrating an exemplary vulcanization mold to be used for forming an elastic member having a plurality of recesses in an inventive production method.

FIG. 5 is a sectional view illustrating an exemplary vulcanization mold to be used for forming the elastic member 1 having the plurality of recesses 6 having the openings in the outer peripheral surface 2 in an inventive production method.

Referring to FIGS. 1 and 5, the vulcanization mold 9 includes a pair of outer molds 11 (upper and lower outer molds 11 in FIG. 5) circumferentially separable from each other and respectively having inner surfaces which cooperatively define a shape-imparting tubular inner surface 10 corresponding to the outer peripheral surface 2 of the elastic member 1, and an inner mold 13 having a shape-imparting tubular outer surface 12 to be located coaxially with the shape-imparting inner surface 10 of the outer molds 11 about a center axis L2 so as to be spaced a distance corresponding to the thickness T of the elastic member 1 from the shape-imparting inner surface 10.

The pair of outer molds 11 each have a plurality of projections 14 projecting radially inward from the shape-imparting inner surface 10, and each having a sectional shape corresponding to the plan shape of the recess 6 and a projection height corresponding to the depth D of the recess 6 as measured along the thickness of the elastic member 1.

The projections 14 are arranged on the shape-imparting inner surface 10 according to the arrangement of the recesses 6 to be formed in the elastic member 1.

The outer molds 11 are vertically separable from each other with respect to a separation plane 15 extending through the center axis L2 of the shape-imparting tubular inner surface 10.

In the inventive production method, a rubber composition is first prepared as a material for the elastic member 1. More specifically, at least one of the rubbers previously described, vulcanization-related agents such as a vulcanizing agent, a vulcanization accelerating agent and a vulcanization acceleration assisting agent for vulcanizing the rubber, and additives are blended in a predetermined ratio, and the resulting mixture is kneaded to prepare the rubber composition.

Then, the vulcanization mold 9 is preheated to a predetermined vulcanization temperature, and a space defined between the shape-imparting inner surface 10 of the outer molds 11 and the shape-imparting outer surface 12 of the inner mold 13 of the vulcanization mold 9 disposed coaxially with each other about the center axis L2 is filled with a predetermined amount of the rubber composition.

More specifically, the upper and lower outer molds 11 are opened to be each spaced a greater distance from the inner mold 13 as shown in an upper portion of FIG. 5 and, in this state, the predetermined amount of the rubber composition is supplied into the space. At this time, the rubber composition may be preheated to a predetermined temperature below the vulcanization temperature.

Then, the upper and lower outer molds 11 are closed to be kept in press contact with each other with a predetermined contact pressure as shown in a lower portion of FIG. 5, so that the outer molds 11 abut against each other on the separation plane 15 with the shape-imparting inner surface 10 thereof disposed coaxially with the shape-imparting outer surface 12 of the inner mold 13 about the center axis L2.

In turn, this state is maintained for a predetermined period of time to vulcanize the supplied rubber composition, and then the resulting elastic member 1 is removed by opening the molds. As required, the outer peripheral surface 2 of the elastic member 1 is ground, and the elastic member 1 is finished to have a predetermined width by cutting axially opposite end portions of the elastic member 1.

Then, a sleeve not shown is fitted in the elastic member 1 with an outer peripheral surface thereof fixed to the inner peripheral surface 3 of the elastic member 1 directly or with an adhesive agent. Thus, the sheet conveying roller is produced.

According to this production method, the sheet conveying roller including the elastic member 1 having the plurality of recesses 6 can be efficiently produced at higher productivity.

Figure 6:
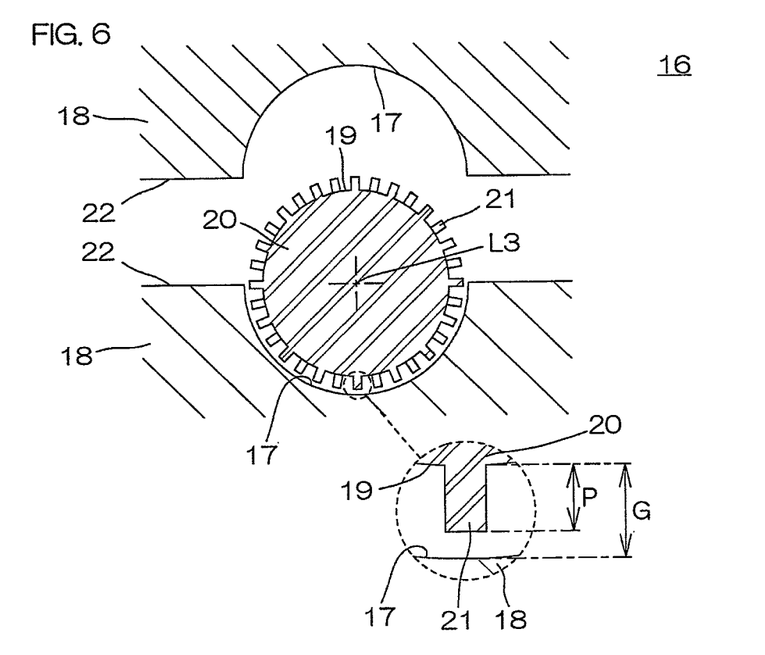
FIG. 6 is a sectional view illustrating an exemplary vulcanization mold to be used for forming an elastic member having a plurality of through-holes in another inventive production method.

FIG. 6 is a sectional view illustrating an exemplary vulcanization mold to be used for forming the elastic member 1 having the plurality of through-holes 8 having the openings in the outer peripheral surface 2 in another inventive production method.

Referring to FIGS. 1 and 6, the vulcanization mold 16 includes a pair of outer molds 18 (upper and lower outer molds 18) circumferentially separable from each other and having inner surfaces cooperatively defining a shape-imparting tubular inner surface 17 having an inner diameter equal to a sum of the outer diameter of the elastic member and a predetermined grinding margin, and an inner mold 20 having a shape-imparting tubular outer surface 19 to be located coaxially with the shape-imparting inner surface 17 about a center axis L3 so as to be spaced a distance equal to a sum of the thickness of the elastic member and the grinding margin from the shape-imparting inner surface 17.

The inner mold 20 includes a plurality of projections projecting radially outward from the shape-imparting outer surface 19 and each having a sectional shape corresponding to the plan shape of the through-hole 8 and a projection height P ($T \leq P \leq G$) that is not less than the thickness T of the elastic member 1 and less than the sum G of the thickness of the elastic member 1 and the grinding margin.

The projections 21 are arranged on the shape-imparting outer surface 19 according to the arrangement of the through-holes 8 to be formed in the elastic member 1.

The outer molds 11 are vertically separable from each other with respect to a separation plane 22 extending through the center axis L3 of the shape-imparting tubular inner surface 17.

In the inventive production method, the vulcanization mold 16 is preheated to a predetermined vulcanization temperature, and a space defined between the shape-imparting inner surface 17 of the outer molds 18 and the shape-imparting outer surface 19 of the inner mold 20 of the vulcanization mold 16 disposed coaxially with each other about the center axis L3 is filled with a predetermined amount of the rubber composition.

More specifically, the upper and lower outer molds 18 are opened to be each spaced a greater distance from the inner mold 13 as shown in an upper portion of FIG. 6 and, in this state, the predetermined amount of the rubber composition is supplied into the space. At this time, the rubber composition may be preheated to a predetermined temperature below the vulcanization temperature.

Then, the upper and lower outer molds 18 are closed to be kept in press contact with each other with a predetermined contact pressure as shown in a lower portion of FIG. 6, so that the outer molds 18 abut against each other on the separation plane 22 with the shape-imparting inner surface 17 thereof disposed coaxially with the shape-imparting outer surface 19 of the inner mold 20 about the center axis L3.

In turn, this state is maintained for a predetermined period of time to vulcanize the supplied rubber composition, and then the resulting elastic body is removed by opening the molds.

In this state, a rubber layer having a thickness corresponding to the grinding margin is present in an outer peripheral portion of the elastic body, so that the recesses formed as corresponding to the projections 21 are not open in the outer peripheral surface 2. Therefore, the outer peripheral portion is ground by the grinding margin, whereby the recesses are open in the outer peripheral surface 2 to form the through-holes 8.

Then, the resulting elastic member 1 is finished to have a predetermined width by cutting axially opposite end portions of the elastic member 1. Then, a sleeve not shown is fitted in the elastic member 1 with an outer peripheral surface thereof fixed to the inner peripheral surface 3 of the elastic member 1 directly or with an adhesive agent. Thus, the sheet conveying roller is produced.

According to this production method, the sheet conveying roller including the elastic member 1 having the plurality of through-holes 8 can be efficiently produced at higher productivity.

The present invention is not limited to the embodiments described above with reference to the drawings.

For example, the recesses 6 or the through-holes 8 are merely required to be equidistantly arranged in the center axis L1 direction of the elastic member 1 and equidistantly arranged in the circumferential direction of the elastic member 1, but the arrangement of the recesses 6 or the through-holes 8 is not limited to that shown in FIG. 1.

Further, all the openings of the recesses 6 or the through-holes 8 are not required to have the same round shape as shown in FIG. 1, but openings of the recesses 6 or the through-holes 8 having two or more different plan shapes may be present in combination in the outer peripheral surface 2. In this case, the openings of the recesses 6 or the through-holes 8 having different plan shapes preferably have the same opening area in order to ensure that the recesses 6 or the through-holes 8 can efficiently and evenly function as the pockets for trapping the paper dust and the dirt on the entire outer peripheral surface 2.

It should be understood that various modifications may be made without departing from the scope of the present invention.

Examples

An elastic member 1 having a three-dimensional shape as shown in FIG. 1, an outer diameter of 24.6 mm and a width of 28.5 mm as measured in a center axis L1 direction thereof and including a plurality of through-holes 8 each having a round plan shape as seen perpendicularly to the outer peripheral surface 2 and arranged in an arrangement as shown in FIG. 1 was produced by the vulcanization utilizing the mold 16 shown in FIG. 6, the grinding of the grinding margin for the exposure of the through-holes 8, and the cutting of the opposite end portions thereof. A mold temperature of 160° C. to 170° C. and a vulcanization period of 20 minutes were employed for vulcanization conditions.

Such elastic members 1 were produced with the outer diameter, the number and the interval of the projections 21 for the through-holes 8 changed to change the opening diameter Φ and the number of the through-holes 8 aligned in each line extending in the center axis L1 direction (in a line containing through-holes greater in number by one) as shown below in Table 1. The number of the through-holes 8 aligned in each line was set so that the product (Φ×N) of the opening diameter Φ and the number N was substantially constant as shown below in Table 1.

A sleeve not shown was fitted in each of the elastic members 1 with an outer peripheral surface thereof fixed to the inner peripheral surface 3 of the elastic member 1 with an adhesive agent. Thus, sheet conveying rollers were produced, which were compatible with a laser printer HP LaserJet (registered trade name) P4515n available from Japan Hewlett Packard Company.

For comparison, an elastic member having the same dimensions as the elastic members 1 but having no through-holes was formed, and a sheet conveying roller was produced by using the elastic member thus formed.

The sheet conveying rollers thus produced were each brought into press contact with a paper sheet (Xerox Business 4200 available from Xerox Corporation and having a width of 60 mm and a length of 210 mm) placed on a TEFLON (registered trade name) plate with a vertical load of 340 gf and, in this state, a transportation force F acting on the paper sheet was measured by means of a load cell while the sheet conveying roller was rotated at a circumferential speed of 105 mm/sec. Then, a friction coefficient $\mu$ was determined from the following expression (4):

$$\mu = F/340 \quad (4)$$

Measurement was performed immediately after the production of each of the sheet conveying rollers (initial measurement) and after 10000 paper sheets (available under the trade name of SILVER STAR from Silver Star Paper Corporation in China) were passed over each of the sheet conveying rollers incorporated as a sheet feed roller in the laser printer (post-endurance measurement).

The results are shown in Table 1.

TABLE 1

| Through-holes 8 | | | Friction coefficient $\mu$ | |
|---|---|---|---|---|
| Opening diameter $\Phi$ (mm) | Number N of through-holes in each line | $\Phi \times N$ | Initial measurement | Post-endurance measurement |
| 0.4 | 42 | 16.8 | 2.05 | 1.0 |
| 0.5 | 34 | 17 | 2.0 | 1.7 |
| 1 | 17 | 17 | 1.9 | 1.6 |
| 5 | 3 | 15 | 1.9 | 1.7 |
| 6 | 2 | 12 | 1.7 | 0.9 |
| 7 | 2 | 14 | 1.7 | 1.0 |
| No through-holes | | | 2.05 | 0.9 |

Table 1 indicates that the opening diameter $\Phi$ of the through-holes 8 as measured on the outer peripheral surface 2 of the elastic member 1 is preferably not less than 0.5 mm and not greater than 5 mm in order to permit the through-holes 8 to properly function as pockets for trapping paper dust and dirt.

Further, it was found that, where the through-holes 8 are provided equidistantly in the center axis L1 direction of the outer peripheral surface 2, the through-holes 8 occupy an area of 50% to 60% of the outer peripheral surface 2 as measured in the center axis L1 direction.

This application corresponds to Japanese Patent Application No. 2012-031793 filed in the Japan Patent Office on Feb. 16, 2012, the disclosure of which is incorporated herein by reference in its entirety.

DESCRIPTION OF REFERENCE CHARACTERS

1 ELASTIC MEMBER
2 OUTER PERIPHERAL SURFACE
3 INNER PERIPHERAL SURFACE
4,5 END FACES
6 RECESSES
7 BOTTOM SURFACES
8 THROUGH-HOLES
9 VULCANIZATION MOLD
10 SHAPE-IMPARTING INNER SURFACE
11 OUTER MOLDS
12 SHAPE-IMPARTING OUTER SURFACE
13 INNER MOLD
14 PROJECTIONS
15 SEPARATION PLANE
16 VULCANIZATION MOLD
17 SHAPE-IMPARTING INNER SURFACE
18 OUTER MOLDS
19 SHAPE-IMPARTING OUTER SURFACE
20 INNER MOLD
21 PROJECTIONS
22 SEPARATION PLANE

What is claimed is:

1. A method of producing a sheet conveying roller including a nonporous tubular elastic member having a plurality of columnar through-holes extending through the elastic member, the method comprising the steps of:
  (1) providing a vulcanization mold which includes an outer mold and an inner mold,
    the outer mold being circumferentially dividable into at least two mold pieces, and having a shape-imparting tubular inner surface having an inner diameter equal to a sum of an outer diameter of the tubular elastic member and a predetermined grinding margin,
    the inner mold having a shape-imparting tubular outer surface to be located coaxially with the shape-imparting inner surface so as to be spaced a distance equal to a sum of a thickness of the elastic member and the grinding margin from the shape-imparting inner surface, and a plurality of projections projecting radially outward from the shape-imparting outer surface and each having a sectional shape corresponding to a plan shape of the columnar through-holes of the elastic member and a projection height that is not less than the thickness of the elastic member and less than the sum of the thickness of the elastic member and the grinding margin, and
  forming a nonporous tubular elastic body having a plurality of columnar recesses corresponding to the projections in an inner peripheral surface of the elastic body by preheating the vulcanization mold, locating the shape-imparting inner surface of the outer mold and the shape-imparting outer surface of the inner mold of the vulcanization mold coaxially with each other, filling a space defined between the shape-imparting inner surface and the shape-imparting outer surface with a rubber composition as a material for the elastic member, and vulcanizing the rubber composition; and
  (2) grinding an outer peripheral portion of the elastic body by the grinding margin to expose the columnar recesses in an outer peripheral surface of the resulting elastic body to form the plurality of through-holes in the elastic member.

* * * * *